US008804758B2

(12) United States Patent
Bender et al.

(10) Patent No.: US 8,804,758 B2
(45) Date of Patent: *Aug. 12, 2014

(54) SYSTEM AND METHOD OF MEDIA OVER AN INTERNET PROTOCOL COMMUNICATION

(71) Applicant: Hipcricket, Inc., New York, NY (US)

(72) Inventors: Douglas F. Bender, Scotts Valley, CA (US); Ali Awais, Santa Clara, CA (US)

(73) Assignee: Hipcricket, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,709

(22) Filed: Feb. 6, 2013

(65) Prior Publication Data

US 2013/0215774 A1 Aug. 22, 2013

Related U.S. Application Data

(63) Continuation-in-part of application No. 12/262,892, filed on Oct. 31, 2008, now Pat. No. 8,335,232, and a continuation of application No. 11/078,059, filed on Mar. 11, 2005, now Pat. No. 7,460,480, and a continuation-in-part of application No. 12/538,687, filed on Aug. 10, 2009.

(60) Provisional application No. 60/552,359, filed on Mar. 11, 2004, provisional application No. 61/089,097, filed on Aug. 15, 2008.

(51) Int. Cl.
*H04J 3/22* (2006.01)
*H04L 29/06* (2006.01)

(52) U.S. Cl.
CPC ....... *H04L 65/1006* (2013.01); *H04L 29/06204* (2013.01)
USPC ...................................... 370/465; 379/93.08

(58) Field of Classification Search
USPC ......... 370/219–220, 225, 235, 236, 252, 282, 370/352–356, 400–401, 410, 465–467, 477, 370/493–495, 496; 379/1.01, 1.03, 9.01, 379/10.01, 15.01, 15.03, 90.01, 93.01, 379/93.08, 142.13, 142.14, 220.01, 221.06, 379/221.07, 399.02
See application file for complete search history.

(56) References Cited

U.S. PATENT DOCUMENTS

| 5,402,481 A | 3/1995 | Waldman ...................... 379/355 |
| 5,809,128 A | 9/1998 | McMullin ..................... 379/215 |

(Continued)

FOREIGN PATENT DOCUMENTS

| EP | 1 885 104 | 2/2008 | ............ H04M 1/253 |
| WO | WO 03/056776 | 7/2003 | ............... H04L 29/06 |
| WO | WO 2007/091264 | 8/2007 | .............. H04M 7/12 |

OTHER PUBLICATIONS

Bennet, "Memory in a flash" www.theage.com.au pp. 1-3 (2004).

(Continued)

*Primary Examiner* — Edan Orgad
*Assistant Examiner* — Curtis A Alia
(74) *Attorney, Agent, or Firm* — David G. Rosenbaum; J. Peter Paredes; Rosenbaum IP, P.C.

(57) ABSTRACT

A real-time bandwidth monitor (RTBM) for VoIP applications are disclosed having a media streaming function to sense the available bandwidth between two endpoints of a VoIP communication (herein, a "call path") utilizing the media streaming function and to adapt in real-time the transmission rate of the media stream to utilize that bandwidth. The media stream may include voice content, video content, or other media content.

25 Claims, 3 Drawing Sheets

(56) References Cited

U.S. PATENT DOCUMENTS

| | | | |
|---|---|---|---|
| 5,987,103 A | 11/1999 | Martino | 379/93.17 |
| 6,014,440 A | 1/2000 | Melkild et al. | 379/269 |
| 6,091,732 A | 7/2000 | Alexander, Jr. et al. | 370/401 |
| 6,104,757 A | 8/2000 | Rhee | 375/240 |
| 6,118,768 A | 9/2000 | Bhatia et al. | 370/254 |
| 6,125,113 A | 9/2000 | Farris et al. | 370/389 |
| 6,141,345 A | 10/2000 | Goeddel et al. | 370/389 |
| 6,185,288 B1 | 2/2001 | Wong | 379/219 |
| 6,256,778 B1 | 7/2001 | Oliver | 717/5 |
| 6,307,853 B1 | 10/2001 | Storch et al. | 370/354 |
| 6,351,464 B1 | 2/2002 | Galvin et al. | 370/356 |
| 6,359,880 B1 | 3/2002 | Curry et al. | 370/352 |
| 6,377,570 B1 | 4/2002 | Vaziri et al. | 370/352 |
| 6,389,005 B1 | 5/2002 | Cruickshank | 370/352 |
| 6,389,038 B1 | 5/2002 | Goldberg et al. | 370/471 |
| 6,434,139 B1 | 8/2002 | Liu et al. | 370/352 |
| 6,445,694 B1 | 9/2002 | Swartz | 370/352 |
| 6,449,251 B1 | 9/2002 | Awadallah et al. | 370/229 |
| 6,496,477 B1 | 12/2002 | Perkins et al. | 370/228 |
| 6,542,497 B1 | 4/2003 | Curry et al. | 370/352 |
| 6,597,686 B1 | 7/2003 | Smyk | 370/352 |
| 6,603,774 B1 | 8/2003 | Knappe et al. | 370/466 |
| 6,618,761 B2 | 9/2003 | Munger et al. | 709/241 |
| 6,636,504 B1 | 10/2003 | Albers et al. | 370/352 |
| 6,658,496 B1 | 12/2003 | Minakata et al. | 710/5 |
| 6,700,956 B2 | 3/2004 | Chang et al. | 379/93.09 |
| 6,760,324 B1 | 7/2004 | Scott et al. | 370/352 |
| 6,763,226 B1 | 7/2004 | McZeal, Jr. | 455/90.2 |
| 6,771,594 B1 | 8/2004 | Upadrasta | 370/228 |
| 6,771,953 B1 | 8/2004 | Chow et al. | 455/417 |
| 6,788,769 B1 | 9/2004 | Waites | 379/93.24 |
| 6,795,540 B1 | 9/2004 | Mow | 379/188 |
| 6,822,957 B1 | 11/2004 | Schuster et al. | 370/389 |
| 6,826,174 B1 | 11/2004 | Erekson et al. | 370/352 |
| 6,856,612 B1 | 2/2005 | Bjelland et al. | 370/338 |
| 6,865,150 B1 | 3/2005 | Perkins et al. | 370/230 |
| 6,886,027 B2 | 4/2005 | Tajiri et al. | 709/202 |
| 6,895,000 B2 | 5/2005 | Lai et al. | 370/352 |
| 6,907,031 B1 | 6/2005 | Ehlinger et al. | 370/352 |
| 6,947,417 B2 | 9/2005 | Laursen et al. | 370/389 |
| 6,954,454 B1 | 10/2005 | Schuster et al. | 370/352 |
| 7,012,888 B2 | 3/2006 | Schoeneberger et al. | 370/217 |
| 7,016,481 B2 | 3/2006 | McElvaney | 379/88.17 |
| 7,046,658 B1 | 5/2006 | Kundaje et al. | 370/352 |
| 7,046,683 B1 | 5/2006 | Zhao | 370/401 |
| 7,092,380 B1 | 8/2006 | Chen et al. | 370/352 |
| 7,113,500 B1 | 9/2006 | Bollinger et al. | 370/352 |
| 7,145,900 B2 | 12/2006 | Nix et al. | 370/352 |
| 7,212,622 B2 | 5/2007 | Delaney et | 379/221.02 |
| 7,213,766 B2 | 5/2007 | Ryan et al. | 235/492 |
| 7,218,722 B1 | 5/2007 | Turner et al. | 379/221.02 |
| 7,283,542 B2 | 10/2007 | Mitchell | 370/401 |
| 7,302,053 B2 | 11/2007 | Chang et al. | 379/220.01 |
| 7,570,630 B1 | 8/2009 | Phillips et al. | 370/352 |
| 7,586,923 B2 | 9/2009 | Zhao et al. | 370/395.52 |
| 7,643,414 B1 | 1/2010 | Minhazuddin | 370/230 |
| 8,165,572 B1 | 4/2012 | Kirchhoff et al. | 455/417 |
| 2001/0038033 A1 | 11/2001 | Habib | 235/375 |
| 2001/0038610 A1* | 11/2001 | Decker et al. | 370/230 |
| 2002/0007273 A1 | 1/2002 | Chen | 704/229 |
| 2002/0052965 A1 | 5/2002 | Dowling | 709/230 |
| 2002/0097843 A1 | 7/2002 | Krol et al. | 379/88.01 |
| 2002/0131604 A1 | 9/2002 | Amine | 381/58 |
| 2002/0147912 A1 | 10/2002 | Shmueli et al. | 713/182 |
| 2002/0184376 A1 | 12/2002 | Sternagle | 709/230 |
| 2002/0191621 A1 | 12/2002 | Jha | 370/401 |
| 2002/0191768 A1 | 12/2002 | Stoughton | 379/219 |
| 2003/0002479 A1 | 1/2003 | Vortman et al. | 370/352 |
| 2003/0012137 A1 | 1/2003 | Abdelilah et al. | 370/229 |
| 2003/0023669 A1 | 1/2003 | DeLima et al. | 709/203 |
| 2003/0064716 A1 | 4/2003 | Gailey et al. | 455/4 |
| 2003/0069934 A1 | 4/2003 | Garcia-Martin et al. | 709/206 |
| 2003/0093606 A1 | 5/2003 | Mambakkam et al. | 710/305 |
| 2003/0110257 A1 | 6/2003 | Hyun et al. | 709/224 |
| 2003/0112820 A1 | 6/2003 | Beach | 370/465 |
| 2003/0123388 A1 | 7/2003 | Bradd | 370/230 |
| 2003/0135376 A1 | 7/2003 | Harada | 704/275 |
| 2003/0161453 A1 | 8/2003 | Veschi | 379/93.05 |
| 2003/0204619 A1 | 10/2003 | Bays | 709/238 |
| 2003/0214939 A1 | 11/2003 | Eldumiati et al. | 370/352 |
| 2003/0219006 A1 | 11/2003 | Har | 370/352 |
| 2003/0224780 A1 | 12/2003 | Rodman et al. | 455/426.1 |
| 2004/0019539 A1 | 1/2004 | Raman et al. | 705/29 |
| 2004/0032860 A1 | 2/2004 | Mundra et al. | 370/352 |
| 2004/0032862 A1 | 2/2004 | Schoeneberger et al. | 370/352 |
| 2004/0047451 A1 | 3/2004 | Barker et al. | 379/67.1 |
| 2004/0086093 A1 | 5/2004 | Schranz | 379/37 |
| 2004/0114581 A1 | 6/2004 | Hans et al. | 370/356 |
| 2004/0133668 A1 | 7/2004 | Nicholas, III | 709/223 |
| 2004/0141508 A1 | 7/2004 | Schoeneberger et al. | 370/401 |
| 2004/0141758 A1 | 7/2004 | El-Reedy | 398/167.5 |
| 2004/0160979 A1* | 8/2004 | Pepin et al. | 370/462 |
| 2004/0165578 A1 | 8/2004 | Burritt et al. | 370/352 |
| 2004/0205023 A1 | 10/2004 | Hafer et al. | 705/43 |
| 2004/0205777 A1 | 10/2004 | Zalenski et al. | 719/320 |
| 2004/0218583 A1 | 11/2004 | Adan et al. | 370/352 |
| 2004/0223458 A1 | 11/2004 | Gentle | 370/230 |
| 2004/0240430 A1 | 12/2004 | Lin et al. | 370/352 |
| 2004/0248590 A1 | 12/2004 | Chan et al. | 455/456.3 |
| 2004/0252701 A1 | 12/2004 | Anandakumar et al. | 370/395.21 |
| 2004/0258003 A1 | 12/2004 | Kokot et al. | 370/254 |
| 2005/0002506 A1 | 1/2005 | Bender et al. | 379/142.01 |
| 2005/0047364 A1 | 3/2005 | Matsukura et al. | 370/328 |
| 2005/0074031 A1 | 4/2005 | Sunstrum | 370/493 |
| 2005/0074122 A1 | 4/2005 | Fascenda | 380/258 |
| 2005/0089052 A1 | 4/2005 | Chen et al. | 370/401 |
| 2005/0091392 A1 | 4/2005 | Gesswein et al. | 709/231 |
| 2005/0094621 A1 | 5/2005 | Acharya et al. | 370/352 |
| 2005/0138183 A1 | 6/2005 | O'Rourke et al. | 709/228 |
| 2005/0157727 A1 | 7/2005 | Date et al. | 370/395.21 |
| 2005/0180464 A1 | 8/2005 | McConnell et al. | 370/494 |
| 2005/0195799 A1 | 9/2005 | Burne et al. | 370/352 |
| 2005/0220083 A1 | 10/2005 | Takeuchi | 370/352 |
| 2005/0243733 A1 | 11/2005 | Crawford et al. | 370/252 |
| 2006/0005033 A1 | 1/2006 | Wood | 713/182 |
| 2006/0008059 A1 | 1/2006 | Ying et al. | 379/88.17 |
| 2006/0029062 A1 | 2/2006 | Rao et al. | 370/389 |
| 2006/0029063 A1 | 2/2006 | Rao et al. | 370/389 |
| 2006/0031393 A1 | 2/2006 | Cooney et al. | 709/217 |
| 2006/0034296 A1 | 2/2006 | Talucci | 370/395.52 |
| 2006/0037071 A1 | 2/2006 | Rao et al. | 726/13 |
| 2006/0039356 A1 | 2/2006 | Rao et al. | 370/352 |
| 2006/0088025 A1 | 4/2006 | Barkley et al. | 370/352 |
| 2006/0183489 A1 | 8/2006 | Modeo | 455/466 |
| 2006/0205404 A1 | 9/2006 | Gonen et al. | 455/432.1 |
| 2006/0208066 A1 | 9/2006 | Finn et al. | 235/380 |
| 2006/0227957 A1 | 10/2006 | Dolan et al. | 379/212.01 |
| 2006/0256810 A1 | 11/2006 | Yarlagadda et al. | 370/465 |
| 2006/0276230 A1 | 12/2006 | McConnell | 455/563 |
| 2007/0015535 A1 | 1/2007 | LaBauve et al. | 455/552.1 |
| 2007/0049329 A1 | 3/2007 | Mayer et al. | 455/552.1 |
| 2007/0167167 A1 | 7/2007 | Jiang | 455/453 |
| 2007/0177580 A1 | 8/2007 | Ragona et al. | 370/352 |
| 2007/0183397 A1 | 8/2007 | Bennett | 370/352 |
| 2007/0201646 A1 | 8/2007 | Metcalf | 379/142.01 |
| 2007/0211767 A1* | 9/2007 | Todd et al. | 370/508 |
| 2007/0217582 A1 | 9/2007 | Lesser | 379/121.04 |
| 2007/0223679 A1 | 9/2007 | Chatterjee et al. | 379/211.02 |
| 2007/0238472 A1 | 10/2007 | Wanless | 455/461 |
| 2007/0248081 A1 | 10/2007 | Barkley et al. | 370/352 |
| 2007/0253545 A1 | 11/2007 | Chatterjee et al. | 379/211.02 |
| 2007/0275702 A1 | 11/2007 | Hwang | 455/414.1 |
| 2007/0280464 A1 | 12/2007 | Hughes et al. | 379/205.01 |
| 2007/0293212 A1 | 12/2007 | Quon et al. | 455/420 |
| 2008/0025291 A1 | 1/2008 | Barkley et al. | 370/352 |
| 2008/0037729 A1 | 2/2008 | Mobin et al. | 379/88.17 |
| 2008/0056239 A1 | 3/2008 | Loingtier | 370/352 |
| 2008/0062997 A1 | 3/2008 | Nix | 370/395.2 |
| 2008/0113649 A1 | 5/2008 | Ibacache et al. | 455/410 |
| 2008/0123686 A1 | 5/2008 | Lee et al. | 370/466 |
| 2008/0139210 A1 | 6/2008 | Gisby et al. | 455/445 |
| 2008/0207190 A1 | 8/2008 | Altberg et al. | 455/422.1 |
| 2008/0253543 A1 | 10/2008 | Aharon | 379/201.12 |
| 2008/0267377 A1 | 10/2008 | Siegrist | 379/201.02 |

(56) References Cited

U.S. PATENT DOCUMENTS

| | | | |
|---|---|---|---|
| 2009/0003316 A1 | 1/2009 | Lee et al. ................ | 370/352 |
| 2009/0073960 A1 | 3/2009 | Kalaboukis ............ | 370/352 |
| 2009/0147778 A1 | 6/2009 | Wanless et al. ......... | 370/389 |
| 2009/0156222 A1 | 6/2009 | Bender et al. .......... | 455/445 |
| 2009/0245179 A1 | 10/2009 | Liu et al. ............... | 370/328 |
| 2009/0281901 A1 | 11/2009 | Lin et al. .............. | 705/14.64 |

OTHER PUBLICATIONS

"Brief introduction to QiiQ Communications Inc. and Eccocarrier Inc." www.qiiq.com pp. 1-7 (printed Jun. 10, 2005 and Jul. 17, 2007).
Camarillo, et al., "Integration of resource management and session initiation protocol (SIP)" *RFC* 3312: 1-30 (2002).
"CommGenie VoIP Suite" www.nexge.com pp. 1-3 (printed Jun. 1, 2005).
EcoCarrier, "Ecophone," www.ecocarrier.com pp. 1-3 (printed Jun. 13, 2005).
"EcoFone + VoIP!Phone Q-FONE-USB" pp. 1-3 (printed Jun. 10, 2005).
"Pocki Phone—VoIP Softphone + USB Flash Disk Drive (128M)" www.welltech.com pp. 1-2 (printed Oct. 5, 2004).
"Pre-paid Call Credits—Adding Extra Call Credits" www.2hands.com.au pp. 1-2 (printed Jun. 1, 2005).
Rosenberg, J., et al, "SIP: Session Initiation Protocol" *RFC* 3261: 1-18 (2002).
Rosenberg, J. et al, "STUN—Simple Traversal of User Datagram Protocol (UDP) Through Network Address Translators (NATs)" *RRC* 3489: 1-47 (2003).
Schulzrinne, H., "Dynamic Host Configuration Protocol (DHCP-for-IPv4) Option for Session Initiation Protocol (SIP) Servers" *RFC* 3361: 1-7 (2002).
"SIPphoneCasting. Inspired by: Skype Podcast Recorder = SkypeCasters" www.linuxathome.com pp. 1-4 (Dec. 29, 2004).
Tittel, E. "Cool Tools: USB Desktop Peripherals and Devices" www.certmag.com pp. 1-7 (Jun. 2005, accessed Jul. 20, 2007).
Trembley, J. "VoIP makes real-time billing a necessity" *Billing Plus*, 6(17): 13 (2004).
"Web Based VoIP Billing, VoIP Routing, and VoIP Management Software," www.webvoip.com pp. 1-2 (printed Jun. 1, 2005).

\* cited by examiner

Banwidth Usage G.723.1 codec with IP packet overhead on Ethernet

SYSTEM AND METHOD OF MEDIA OVER AN INTERNET PROTOCOL COMMUNICATION

CLAIM OF PRIORITY

This application is a continuation-in-part patent application of, and claims priority from, U.S. patent application Ser. No. 12/262,892, filed Oct. 31, 2008 and entitled "METHOD AND SYSTEM OF RENEGOTIATING END-TO-END VOICE OVER INTERNET PROTOCOL CODECS," which is a continuation of U.S. patent application Ser. No. 11/078,059, filed Mar. 11, 2005 (now U.S. Pat. No. 7,460,480) and entitled "DYNAMICALLY ADAPTING THE TRANSMISSION RATE OF PACKETS IN REAL-TIME VOIP COMMUNICATIONS TO THE AVAILABLE BANDWIDTH," which claims the benefit of U.S. Provisional Patent Application No. 60/552,359, filed on Mar. 11, 2004, each of which is hereby incorporated by reference in its entirety.

This application is a continuation-in-part patent application of, and claims priority from, U.S. patent application Ser. No. 12/538,687, filed on Aug. 10, 2009, and entitled "SYSTEMS AND METHODS OF INITIATING A CALL," which claims the benefit of U.S. Provisional Patent Application No. 61/089,097, filed Aug. 15, 2008, each of which is hereby incorporated by reference in its entirety.

BACKGROUND

The present invention relates generally to the field of Voice-Over-Internet-Protocol (VoIP). More particularly, the present invention provides means for adapting the bandwidth requirement of a real-time communication to the available bandwidth of the underlying transport network.

In traditional circuit switched telephony, a continuous data "pipe" is provided through the Public Switched Telephone Network (PSTN) to guarantee the flow of the PCM voice data. Internet telephony on the other hand must overcome a variety of impairments to the regular and timely delivery of voice data packets to the far end. These impairments are inherent in current Internet architecture, which provides a best-effort delivery service without any guarantees regarding the delivery of voice packets. Additionally, the transport of the voice packets is constrained by the amount of bandwidth available in the network connection, the delay that the packet experiences and any packet loss or corruption that occurs. In general, the measure of the quality of a data network to transport voice data packets quickly and consistently is referred to as the network's Quality of Service (QoS).

A variety of network conditions affect the QoS of a connection. The bandwidth (BW) is the measure of the number of bits per second that can flow through a network link at a given time. Available bandwidth is limited by both the inherent capacity of the underlying network as well as other traffic along that route. End-to-end bandwidth from sender to receiver (the "call path") will be determined by the slowest link on the entire route. For example, a dialup connection to the ISP with an ideal bandwidth of 56 kilobits per second (kb/s) may be the slowest link for a user. However, the bandwidth actually available to a VoIP application on this link at a particular time will be lower if a larger file transfer is taking place at that time.

The bandwidth usage per channel is determined primarily by the compressor/decompressor (CODEC) used to digitize and compress voice data and its associated overhead. Table 1 lists the one-way bandwidth requirements of three popular voice CODECs and a Mean Opinion Score (MOS) based on the ITU-T recommendation for measuring voice quality (higher MOS values indicate better quality).

TABLE 1

| CODEC | NOMINAL DATA RATE (one way only) kbps | MOS |
|---|---|---|
| G.711 | 64 | |
| G.729 | 8 | |
| G.723 v1 | 6.3 | |
| G.723 v2 | 5.3 | |

As illustrated in Table 1, voice CODECs such as G.723 and G.729 significantly reduce the data bandwidth required. There is, however, a general tradeoff between using a high compression voice CODEC (with its low bandwidth usage) and voice quality. The high compression CODECs typically have slightly reduced voice quality (as reflected in the MOS rating), and introduce additional delay due to the added computational effort. The highest bandwidth is required by the minimal compression G.711 CODEC, which is the standard toll quality CODEC.

Another factor in bandwidth usage is the overhead introduced by different IP layers. Most CODECs operate by collecting a block of voice samples and then compressing this block to produce a frame of coded voice. As this media frame is prepared for transport over IP, different protocol layers add their own headers to the data to be able to recreate the voice stream at the destination. FIG. 1 illustrates how an IP datagram carrying a single G.723.1 version-1 frame might look on a dial-up line.

Protocol overhead can be reduced by including more than one media frame per datagram (or packet). This also reduces the number of packets sent per second and hence the bandwidth usage. FIG. 2 illustrates an example how the bandwidth usage is reduced when using 2, 3 and 4 frames per IP datagram using G.723.1 v1 CODEC. This improved efficiency comes at the cost of increased delay, but also has a positive side effect of improving jitter-tolerance. The effect of delay and jitter on voice quality is described below.

Delay along the voice transmission call path can significantly affect voice quality. If the delay is too large, for example greater than 400 ms (ITU-T recommendation), interactive communication will be impossible. Many factors contribute to delay in VoIP, the most important being the delay experienced by VoIP media packets on the network. Another source of delay is the CODEC used for processing voice. High compression CODECs introduce more delay than low compression CODECs.

VoIP media packets comprising a data stream may not experience the same delay. Some packets may be delayed more than others due to instantaneous network usage and congestion or as a result of traversing different routes through the network. This variance from the average delay is called jitter. Voice CODECs will produce poor voice output if the input packet stream is not delivered at the exact play-out time. A jitter buffer at the receiver can smooth out this variation but it adds some more delay. If the jitter is larger than what the buffer can handle, the jitter buffer may underflow or overflow, resulting in packet loss.

QoS is also degraded by packet loss. The most common cause of packet loss on land-based networks is the overloading of a router queue along the transmission call path. In this case, the router will discard packets. On land-based networks, packet loss is therefore a sign of network congestion. Packets can also be lost because of corruption. Internet routers are programmed to discard corrupted packets. Voice CODECs can generally cope with small random packet losses, by interpolating the lost data. Large packet loss ratio or burst packet loss can severely degrade voice quality. The exact limits vary by the CODEC used but generally, low compression CODECs are more tolerant to packet loss.

The lack of QoS guarantees on the Internet has been a major challenge in developing VoIP applications. IETF is working on a number of proposals to help guarantee the quality of service that time critical data such as VoIP services require, including:

Differentiated Service ("Diffserv") which instructs the network routers to route based on priority bits in the packet header.

Integrated Services and RSVP to set up end-to-end virtual channels that have reserved bandwidth similar to circuit-switched telephony.

Multi-protocol Label switching, which uses labels inserted into the packets to route traffic in an efficient way.

These services are, however, not currently available on the present day Internet. VoIP applications on end systems are required to work around the hurdles presented to regular and timely data flow. The Internet offers a best effort delivery service. So long as sufficient bandwidth is available, VoIP traffic can flow smoothly with an acceptable QoS. If the bandwidth is constrained, the effects described above will result in degraded voice quality.

What would be desirable are means to allow VoIP applications to sense the current call path bandwidth and to adapt in real-time the transmission rate to utilize that bandwidth.

SUMMARY OF THE INVENTION

Embodiments of the present invention provide a real-time bandwidth monitor (RTBM) for VoIP applications having a media streaming function to sense the available bandwidth between two endpoints of a VoIP communication (herein, a "call path") utilizing the media streaming function and to adapt in real-time the transmission rate of the media stream to utilize that bandwidth. The media stream may include voice content, video content, or other media content. If sufficient bandwidth is available, the RTBM selects a set of low compression, low latency CODECs to offer best possible media stream quality to the user. If the bandwidth is constrained, the RTBM, instead of allowing the VoIP application to fail, degrades gracefully by switching to a set of high compression CODECs. On further bandwidth reduction, the RTBM increases the media frames per packet. Because the bandwidth reduction may be transitory, the RTBM constantly monitors the end-to-end available bandwidth so as to invoke the CODEC set/frame per packet combination that provides the best QoS achievable over the current end-to-end available bandwidth.

It is therefore an aspect of the present invention to monitor current end-to-end available bandwidth in a VoIP communication using a real-time bandwidth monitor (RTBM) and to adapt in real-time the transmission rate of a VoIP application to utilize that bandwidth.

It is another aspect of the present invention that if the RTBM determines that sufficient bandwidth is available, to select a set of low compression, low latency CODECs to offer the best possible media stream quality to the user.

It is still another aspect of the present invention that if the RTBM determines that bandwidth is limited, to switch to a set of high compression CODECs.

It is yet another aspect of the present invention that if the RTBM determines that the bandwidth is highly restricted, to increase the media frames per packet.

It is an aspect of the present invention to constantly monitor the call path available bandwidth so as to invoke the CODEC set/frame per packet combination that provides the best QoS achievable over the current call path available bandwidth.

It is another aspect of the present invention to determine improvements in bandwidth for VoIP media communications by making specialized measurements via "probe packets" sent prior to media startup and during conversation "silence periods" so that no additional network bandwidth is consumed for making the measurement.

It is still another aspect of the present invention to provide a RTBM that is application independent and able to adjust the send rate automatically in a plug and play fashion.

These and other aspects of the present invention will become apparent from a review of the general and detailed descriptions that follow.

An embodiment of the present invention provides a method for adapting the transmission rate of media packets between endpoints in a voice over Internet protocol (VoIP) communication. A starting bandwidth measure at a starting endpoint is determined. A starting CODEC set at the starting endpoint is selected based on the starting bandwidth measure. The starting CODEC set is associated with a starting CODEC set nominal data rate. An ending bandwidth measure at the ending endpoint is determined. An ending CODEC set at the ending endpoint is selected based on the ending bandwidth measure. The ending CODEC set is associated with an ending CODEC set nominal data rate. The ending endpoint is informed of the starting CODEC set nominal data rate. The starting endpoint is informed of the ending CODEC set nominal data rate. A current CODEC set comprising a data rate equal to the lower of the starting CODEC set nominal data rate and the ending CODEC set nominal data rate is selected and used at the starting and ending end points.

In another embodiment of the present invention, the starting bandwidth measure is determined by sending a starting probe packet from the starting endpoint to a network device. According to embodiments of the present invention, the network device is selected from the group consisting of a STUN server, a SIP server, and an echo server. The starting probe packet is echoed by the network device to the starting endpoint. The bandwidth of the path from the starting endpoint to the network device is then determined.

The starting CODEC set is associated with a bandwidth range. A determination is made whether the starting bandwidth measure is within the bandwidth range. If so, the starting CODEC set is selected.

In another embodiment of the present invention, a packet loss ratio of a media packet stream between the starting endpoint and the ending endpoint is obtained. A determination is made whether the packet loss ratio exceeds a maximum packet loss ratio associated with the current CODEC set. If the packet loss ratio exceeds the maximum packet loss ratio, then a nominal in-use data rate of the current CODEC set is determined. A determination is made whether the current CODEC is associated with an alternate nominal data rate that is lower than the nominal in-use data rate. If current CODEC set is associated with an alternate nominal data rate that is lower than the in-use data rate, the alternate nominal data rate is substituted for the in-use nominal data rate.

If the current CODEC set is not associated with an alternate nominal data rate that is lower than the in-use nominal data rate, a determination is made whether a current frames per packet measure is less than a maximum frames per packet measure associated with the current CODEC set. If the current frames per packet measure is less than the maximum frames per packet measure associated with the current CODEC set, then the frames per packet measure of the media packet is increased.

If the current frames per packet measure is greater than or equal to the maximum frames per packet, then a determination is made whether a substitute CODEC set having a substitute nominal data rate that is lower than the nominal data rate of the current CODEC set is available at the starting and ending endpoints. If the substitute CODEC set is available at the starting and ending endpoints, then the substitute CODEC set is used at the starting and ending endpoints.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Embodiments of the present invention provide a real-time bandwidth monitor (RTBM) for VoIP applications to sense the available bandwidth between two endpoints of a VoIP communication (herein, a "call path") and to adapt in real-time the transmission rate to utilize that bandwidth. If sufficient bandwidth is available, the RTBM selects a set of low compression, low latency CODECs to offer best possible media stream quality to the user. The set of low compression, low latency CODECs comprises at least one CODEC. If the bandwidth is constrained, the RTBM, instead of allowing the VoIP application to fail, degrades gracefully by switching to a set of high compression CODECs. The set of high compression CODECs comprises at least one CODEC. On further bandwidth reduction, the RTBM increases the media frames per packet of the in use CODEC set. Because the bandwidth reduction may be transitory, the RTBM constantly monitors the end-to-end available bandwidth of the path so as to invoke the CODEC set/frame per packet combination that provides the best QoS achievable over the current end-to-end available bandwidth.

Figure 1:
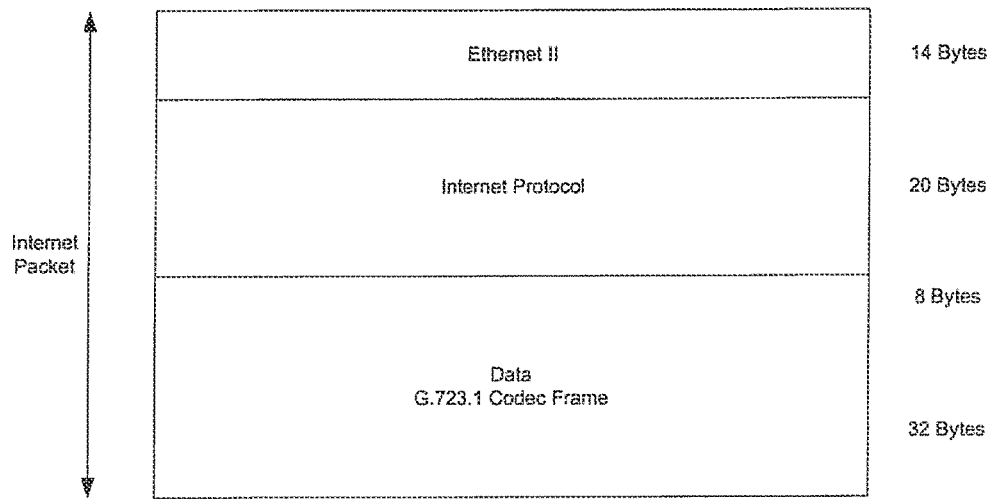
FIG. 1 illustrates how an IP datagram carrying a single G.723.1 version-1 frame might look on a dial-up line as known in the prior art.
Figure 2:
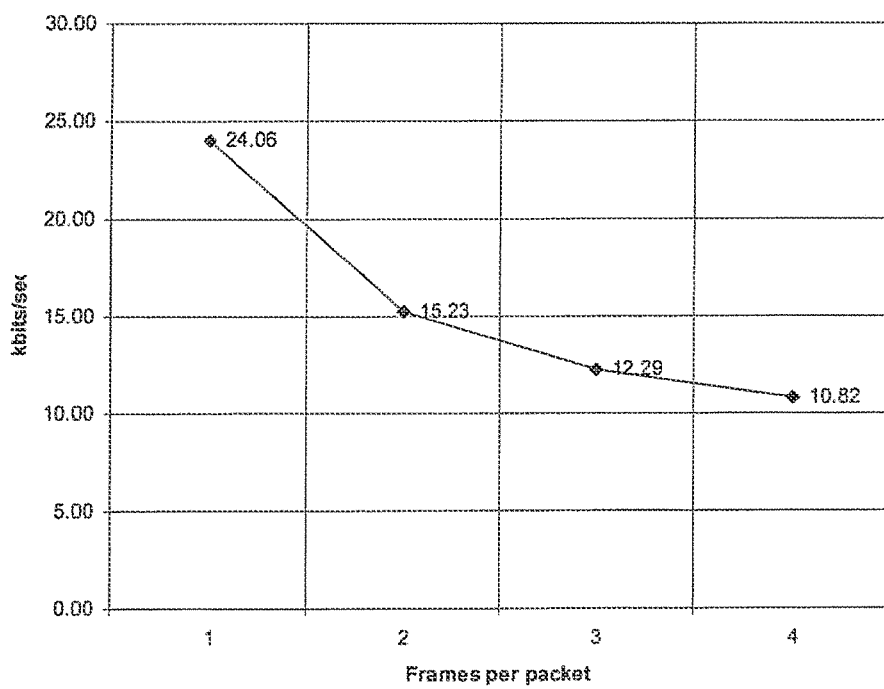
FIG. 2 illustrates an example of how the bandwidth usage is reduced when using 2, 3 and 4 frames per IP datagram using a G.723.1 v1 CODEC as is known in the prior art.
Figure 3:
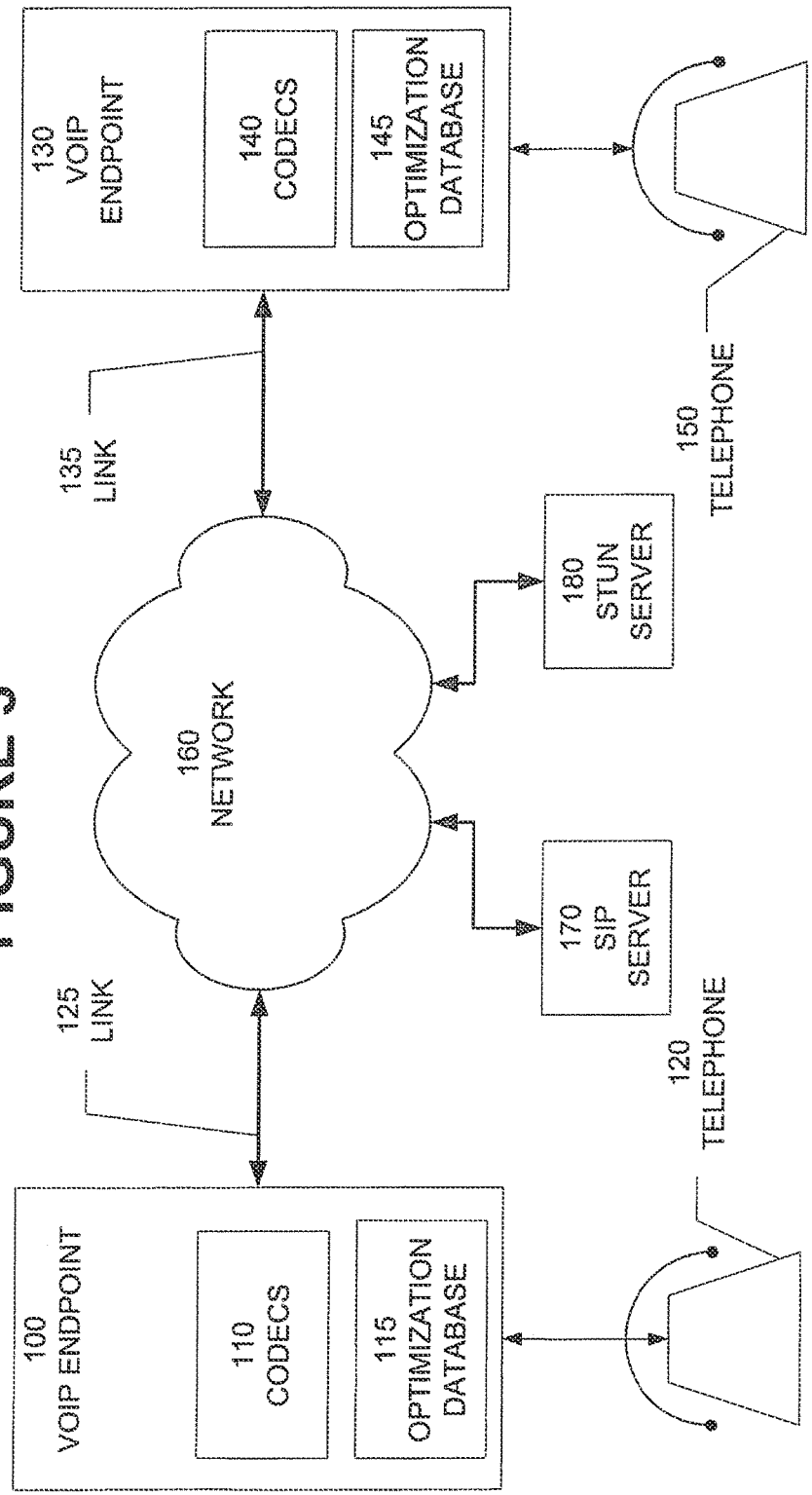
FIG. 3 illustrates a typical call path VoIP system according to embodiments of the present invention.

FIG. 3 illustrates a typical call path of a VoIP system according to embodiments of the present invention. Referring to FIG. 3, a VoIP endpoint 100 comprising one or more CODECs 110 is connected to a communication device 120. VoIP endpoint 100 is also connected to a network 160 via a link 125. A VoIP endpoint 130 comprising one or more CODECs 140 is connected to a communication device 150. VoIP endpoint 130 is also connected to a network 160 via a link 135. Network 160 is an IP network such as the Internet. Links 125 and 135 provide means for connecting the VoIP endpoint (100 and 130) to network 160, including dialup connections, DSL connections, and wireless connections. The VoIP endpoint (100 and 130) may also be located behind a LAN (not illustrated) in which case the connection to network 160 is made through a router (not illustrated). Typically, the VoIP endpoint (100 and 130) is a VoIP gateway. However, the present invention is not so limited. The VoIP endpoint (100 and 130) may be a computer, a VoIP-enabled telephone, or other device capable of performing the tasks associated with the VoIP endpoint, such as, for example and without limitation, audio and video capture and transmission.

When a "call" is placed from communication device 120 to communication device 150, the quality of the media stream signal is affected by the CODEC set used and the bandwidth of the network path between them. In an embodiment of the present invention, VoIP endpoint 100 and VoIP endpoint 130 each comprise an optimization database (115 and 145 respectively). Each entry in the database maps a range of bandwidth calculations to a set of pre-computed optimizations for different CODECs and frames per packet.

In an embodiment of the present invention, optimization databases 115 and 145 list all usable CODEC and frames per packet combinations. For each CODEC and frame rate combination, optimization databases 115 and 145 further list the minimum required bandwidth and the maximum tolerable packet loss ratio. The required bandwidth entries are pre-computed values. The maximum tolerable packet loss ratio is an experimentally determined quantity.

In order to establish a VoIP communication, the endpoints will typically use a signaling protocol such as IETF's SIP or ITU-Ts H323. Alternatively, the signaling protocol, without limitation, may be ITU-T's H.320 or H.324. If a calling endpoint knows the address of a destination endpoint, the calling endpoint sends a setup request directly to the destination endpoint. If the calling endpoint only knows an alias or "telephone number," the calling endpoint resolves the alias or telephone number into an IP address by using a directory service. Alternatively, the calling endpoint may forward the setup request to a proxy server that will perform the address resolution and forward the setup request to the destination endpoint on behalf of the sender. Once the call setup negotiations are complete, the two endpoints exchange media using the RTP protocol, which provides all the necessary information to reassemble a media stream from packets. When the media session is in progress, each receiver uses RTCP to send feedback to the sender about the quality of the packet stream it is receiving.

In addition to these protocols, VoIP devices may require to implement supplementary protocols to function properly. One such protocol is STUN that is used by an endpoint on a private LAN to determine an external routable IP address.

Figure 4:
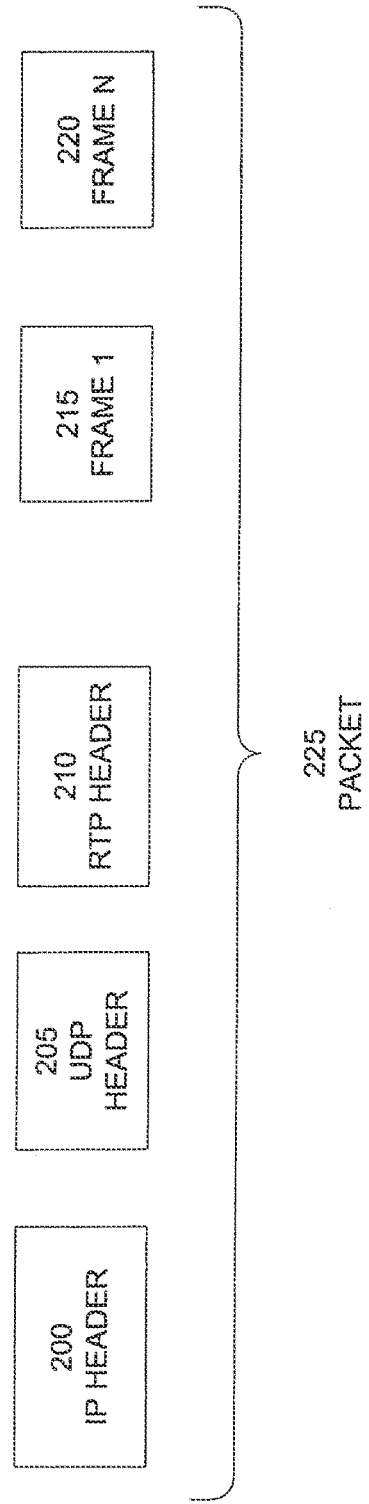
FIG. 4 illustrates the architecture of a typical voice packet as known in the prior art.

FIG. 4 illustrates the architecture of a typical voice packet. The coded voice is assembled into packets as it is being prepared for transport over a VoIP link. The TCP/IP protocol stack, using UDP (User Datagram Protocol) and RTP (Real Time Protocol) executes this process. Referring to FIG. 4, packet 225 comprises an IP 200, a UDP 205, and an RTP 210 header. Together, these headers utilize 40 bytes. These headers comprise protocol information needed to properly transport the data. Included in this protocol information is data such as the source and destination IP addresses, the IP port number, the packet sequence number, etc. An important consideration for an IP telephony network is whether one 215 or more frames 220 of coded media data follow the headers. Using the G.723.1 CODEC, each packet would have only 24 bytes of data to 40 bytes of header. Thus, the header would be 67% of the entire packet. Adding more frames of coded media will decrease the header to payload ratio but will also increase latency and sensitivity to packet losses.

A video codec is a device or software that enables compression or decompression of digital video, where the compression is usually lossy. There is a complex balance between the video quality, the quantity of the data needed to represent it (also known as the bit rate), the complexity of the encoding and decoding algorithms, robustness to data losses and errors, ease of editing, random access, the state of the art of compression algorithm design, end-to-end delay, and a number of other factors.

Video codecs seek to represent a fundamentally analog data set in a digital format. Because of the design of analog video signals, which represent luma and color information separately, a common first step in image compression in codec design is to represent and store the image in a YCbCr color space, in one embodiment. The conversion to YCbCr provides two benefits: first, it improves compressibility by providing decorrelation of the color signals; and second, it separates the luma signal, which is perceptually much more important, from the chroma signal, which is less perceptually important and which can be represented at lower resolution to achieve more efficient data compression. It is common to represent the ratios of information stored in these different channels in the following way Y:Cb:Cr. Refer to the following article for more information about Chroma subsampling.

Different codecs will use different chroma subsampling ratios as appropriate to their compression needs. In one embodiment, video compression schemes for Web and DVD make use of a 4:2:0 color sampling pattern, and the DV standard uses 4:1:1 sampling ratios. In another embodiment, professional video codecs designed to function at much higher bitrates and to record a greater amount of color information for post-production manipulation sample in 3:1:1 (uncommon), 4:2:2 and 4:4:4 ratios. Examples of these codecs include Panasonic's DVCPRO50 and DVCPROHD codecs (4:2:2), and then Sony's HDCAM-SR (4:4:4) or Panasonic's HDD5 (4:2:2). Apple's new Prores HQ 422 codec also samples in 4:2:2 color space. More codecs that sample in 4:4:4 patterns exist as well, but are less common, and tend to be used internally in post-production houses. In another embodiment, video codecs can operate in RGB space as well. RGB codecs tend not to sample the red, green, and blue channels in different ratios, since there is less perceptual motivation for doing so—just the blue channel could be undersampled.

In some embodiments, some amount of spatial and temporal downsampling may also be used to reduce the raw data rate before the basic encoding process. The most popular such transform is the 8×8 discrete cosine transform (DCT). Codecs may make use of a wavelet transform, especially in camera workflows which involve dealing with RAW image formatting in motion sequences. The output of the transform is first quantized, then entropy encoding is applied to the quantized values. When a DCT has been used, the coefficients are typically scanned using a zig-zag scan order, and the entropy coding typically combines a number of consecutive zero-valued quantized coefficients with the value of the next non-zero quantized coefficient into a single symbol, and also has special ways of indicating when all of the remaining quantized coefficient values are equal to zero. The entropy coding method typically uses variable-length coding tables. Some encoders can compress the video in a multiple step process called n-pass encoding (e.g. 2-pass), which performs a slower but potentially better quality compression.

The decoding process consists of performing, to the extent possible, an inversion of each stage of the encoding process. The one stage that cannot be exactly inverted is the quantization stage. There, a best-effort approximation of inversion is performed. This part of the process is often called "inverse quantization" or "dequantization", although quantization is an inherently non-invertible process. This process involves representing the video image as a set of macroblocks. Online video material is encoded by a variety of codecs, and this has led to the availability of codec packs—a pre-assembled set of commonly used codecs combined with an installer available as a software package for PCs, such as K-Lite Codec Pack.

In many embodiments, the VoIP communication may further have the option of enabling "video chat" functionality, such that both audio and video content are communicated between the VoIP endpoints. Similar to audio compression, there are numerous CODECs available for compressing video content. Some particular examples include, without limitation, H.264, H.264/SVC, H.263-1988, H.261, MPEG-4, WMV, and VC-1. Examples of MPEG-4 codecs include DivX Pro Codec, ASP codec made by DivX, Inc., Xvid that is a free/open-source implementation of MPEG-4 ASP, FFmpeg MPEG-4, and 3ivx. Examples of H.264/SVC include x264 that is a GPL-licensed implementation of the H.264 video standard, Nero Digital that is a commercial MPEG-4 ASP and AVC codecs developed by Nero AG, QuickTime H.264 that is a H.264 implementation released by Apple, and DivX Pro Codec that is an H.264 decoder and encoder was added in version 7. Examples of WMV (Windows Media Player) codes by Microsoft include WMV 7, WMV 8, and WMV 9, and MS MPEG-4v3. Other codecs include: VP6, VP6-E, VP6-S, VP7, VP8, which are high definition video compression formats and codecs developed by On2 Technologies used in platforms such as Adobe Flash Player 8, Adobe Flash Lite, Java FX and other mobile and desktop video platforms. VP8 has been made open source by Google under the name libvpx or VP8 codec library. Libtheora is a reference implementation of the Theora video compression format developed by the Xiph.org Foundation, based upon On2 Technologies' VP3 codec. Schrödinger and dirac-research: implementations of the Dirac compression format developed by BBC Research at the BBC. Dirac provides video compression from web video up to ultra HD and beyond. DNxHD codec is a lossy high-definition video production codec developed by Avid Technology as an implementation of VC-3. Sorenson 3 is a video compression format and codec that is used by Apple's QuickTime, sharing many features with H.264. Sorenson Spark is a codec and compression format that was licensed to Macromedia for use in its Flash Video starting with Flash Player 6. It is considered as an incomplete implementation of the H.263 standard. RealVideo by RealNetworks, which is a compression format and codec technology. Cinepak is a very early codec used by Apple's QuickTime. Indeo is an older video compression format and codec initially developed by Intel.

Video CODECs may be used simultaneously with voice CODECs to deliver a media stream comprising both audio and video content, as indicated in Table 2.

TABLE 2

Audio: WMA Standard and WMA Professional
Video: WMV and VC-1
Audio: AAC-LC, HE-AAC v1 (AAC+), HE-AAC v2 (eAAC+), MPEG-4 Part 2*
Video: H.264
Audio: AAC-LC, HE-AAC v1 (AAC+), HE-AAC v2 (eAAC+), AMR-NR
Video: H.264, H.263

In an exemplary embodiment, during the time when the calling endpoint has sent a call setup request and the called endpoint has not yet responded with the final acknowledgment, the endpoints measure the bandwidth of the actual media path by bouncing probe packets off each other. Prior to this measurement, the two endpoints exchange media channel information. Both SIP and H.323 provide mechanisms for achieving this. Additionally, the two endpoints start echo servers on the same port as they intend to receive media on. When the above two conditions are met, both endpoints "ping" the peer and measure the path Round Trip Time (RTT), which can be used to calculate the available bandwidth. This gives a more accurate measure of the path bandwidth and can be used to fine-tune the frames per packet for the media stream.

In another embodiment of the present invention, the bandwidth is measured using a fixed number of probe packets. By way of illustration and not as a limitation, in an exemplary embodiment of the present invention, five packets of different sizes are used to determine the bandwidth. The RTT for each packet size is measured twice and then the minimum of the two is used. Using linear regressions, the slope of the line that fits a plot of RTT samples against packet size is determined using the following formula:

$$m = (n * \text{sigma} XY - \text{sigma} X * \text{sigma} Y)/(n * \text{sigma}(X^2) - (\text{sigma} X)^2)$$

where Y=RTT, X=size of packet, n=number of samples, m=slope, and sigma is a summing function.

The slope m can be calculated as the samples are collected, therefore there is no need to first collect all samples and then process them afterwards. The bandwidth is then calculated as follows:

$$\text{bandwidth} = 1/m$$

In this exemplary embodiment, when a call session is established, the calling VoIP endpoint presents its preferred CODEC set to the called endpoint and the called endpoint presents its preferred CODEC set to the calling endpoint. The CODEC set associated with the lower nominal data rate is used by both endpoints for the media stream. For most cases this is a good choice and the media path can easily provide the bandwidth required by the media stream.

RTP and RTCP protocols are used for the media exchange. The RTP protocol provides mechanisms for transporting the actual media content payload. The RTP header includes sequence number, timestamp and source identifier. this information is used to reconstruct the stream from the individual packets and to detect lost, delayed or out of sequence packets. Each receiving endpoint collects information about the total number of lost packets and packet arrival jitter (variation in packet arrival times) and conveys this information back to the sending endpoint using RTCP protocol at regular intervals. The jitter buffer in each endpoint will smooth out jitter within a certain range and rearrange out of sequence packets. However, if a packet is delayed beyond the capability of the jitter buffer, it will be considered a lost packet. Similarly, a burst of packets that causes the jitter buffer to overflow will result in lost packets. According to the exemplary embodiment, each receiving endpoint also collects the number of packets lost due to jitter buffer overflow and underflow and passes this information to the sending endpoint through RTCP as jitter buffer packet loss.

The jitter packet loss provides a measure of network jitter and delay. Excessive packet loss is an indication that the media path is not able to support the bandwidth requirements of the media stream. If the packet loss ratio exceeds the acceptable packet loss ratio for the current CODEC set configuration as established in the optimization databases (see FIGS. 3, 115 and 145) and if the condition persists for a preset amount of time, an endpoint may take one of the following actions, preferably in the following order: 1. If the current CODEC set utilizes a variable bit rate CODEC such as G.723.1 and the current bit rate is not the lowest bit rate offered by the variable bit rate CODEC, then switch to lower bit rate encoding. 2. If the current frames per packet are less than the maximum frames per packet values for the CODECs of the current CODEC set, then increase the frames per packet. 3. If the current frames per packet is equal to the maximum allowed frames per packet for the CODECs of the current CODEC set and a lower bandwidth CODEC set is available, negotiate using the lower bandwidth CODEC set with the other endpoint.

In still another embodiment of the present invention, if action 1 or 2 above has been taken, the bandwidth is periodically measured during silence intervals to determine if the conditions are again suitable for restoring the previous CODEC set configuration.

Systems and methods for dynamically adapting the transmission rate for real-time communication over IP communications to the available bandwidth have been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Additionally, as will be appreciated by those skilled in the art, references to specific network protocols are illustrative and not limiting. Further, any reference to claim elements in the singular, for example, using the articles "a," "an," or "the" is not to be construed as limiting the element to the singular.

What is claimed is:

1. A method of streaming media content between endpoints during a VoIP communication, comprising the steps of:
    a. Monitoring a packet loss measure during a VoIP communication including a media streaming function between a first endpoint and a second endpoint, wherein the first endpoint and the second endpoint use a first CODEC set to conduct the media streaming function, wherein the first CODEC set comprises at least one CODEC;
    b. determining whether a current frames per packet value used by the at least one CODEC of the first CODEC set is greater than or equal to a maximum frames per packet threshold associated with the at least one CODEC of the first CODEC set;
    c. when the monitored packet loss measure exceeds a maximum packet loss threshold and when the current frames per packet value used by the at least one CODEC of the first CODEC set is greater than or equal to the maximum frames per packet threshold associated with the at least one CODEC of the first CODEC set, negotiating use of a substitute CODEC set having a substitute nominal data rate that is lower than an in-use nominal data rate of the first CODEC set, wherein the substitute CODEC set comprises at least one CODEC; and
    d. continuing the media streaming using the substitute CODEC set.

2. The method of claim 1, further comprising determining a starting bandwidth measure to select the first CODEC set before beginning to monitor the packet loss measure.

3. The method of claim 2, wherein determining the starting bandwidth measure comprises:

sending a starting probe packet from the first endpoint to a network device;

receiving an echoed starting probe packet from the network device at the first endpoint; and determining the bandwidth of the path from the first endpoint to the network device.

4. The method of claim 3, wherein the network device is selected from a STUN server, a SIP server, and an echo server.

5. The method of claim 2, further comprising negotiating the first CODEC set based on a plurality of CODECs available at the first endpoint, a plurality of CODECs available at the second endpoint, and the starting bandwidth measure.

6. The method of claim 5, wherein negotiating the first CODEC set includes determining a bit rate and a frames per packet value to be used by the first endpoint and the second endpoint.

7. The method of claim 5, wherein negotiating the first CODEC set comprises:

accessing an optimization database, wherein the optimization database lists a plurality of CODECs and a bandwidth range associated with each of the plurality of CODECs; and selecting as the first CODEC set at least one CODEC associated with a particular bandwidth range within which the starting bandwidth measure falls.

8. The method of claim 1, further comprising, before negotiating use of the substitute CODEC set:

determining a packet loss ratio of a media packet stream of the communication;

determining whether the packet loss ratio exceeds a maximum packet loss ratio associated with the at least one CODEC of the first CODEC set;

when the packet loss ratio exceeds the maximum packet loss ratio, determining the in-use nominal data rate of the at least one CODEC of the first CODEC set;

determining whether the at least one CODEC of the first CODEC set is associated with an alternate nominal data rate that is lower than the in-use nominal data rate; and when the at least one CODEC of the first CODEC set is associated with an alternate nominal data rate that is lower than the in-use nominal data rate, substituting the alternate nominal data rate for the in-use nominal data rate.

9. The method of claim 8, further comprising:

when the at least one CODEC of the first CODEC set is not associated with an alternate nominal data rate that is lower than the in-use nominal data rate, determining whether the current frames per packet value is less than the maximum frames per packet measure associated with the at least one CODEC of the first CODEC set; and when the current frames per packet measure is less than the maximum frames per packet measure associated with the at least one CODEC of the first CODEC set, increasing the number of frames per packet used by the at least one CODEC of the first CODEC set.

10. The method of claim 1, wherein the packet loss measure includes a ratio of a media packet stream between the first endpoint and the second endpoint.

11. A system, comprising:

a communications endpoint, the communications endpoint adapted to:

monitor a packet loss measure between the communications endpoint and a second communications endpoint during a communication using a first CODEC set, wherein the first CODEC set comprises at least one CODEC;

determine whether a current frames per packet value used by the at least one CODEC of the first CODEC set is greater than or equal to a maximum frames per packet threshold associated with the at least one CODEC of the first CODEC set; and negotiate with the second communications endpoint to select a substitute CODEC set having a nominal data rate that is lower than an in-use nominal data rate of the at least one CODEC of the first CODEC set when the monitored packet loss measure exceeds a maximum packet loss threshold and when the frames per packet value used for the communication is greater than or equal to the maximum frames per packet threshold, wherein the substitute CODEC set comprises at least one substitute CODEC.

12. The system of claim 11, further comprising a telephone coupled to the communications endpoint.

13. The system of claim 11, wherein the communications endpoint comprises a telephone.

14. The system of claim 11, wherein the at least one CODEC of the substitute CODEC set and a frames per packet value for the at least one CODEC of the substitute CODEC set are selected from a plurality of available CODEC and frames per packet value combinations, wherein the at least one CODEC of the substitute CODEC set and the frames per packet value are selected to provide an enhanced quality of service.

15. The system of claim 11, wherein the communications endpoint is further adapted to determine a measurement of available bandwidth between the communications endpoint and the second communications endpoint, and to adjust a transmission rate of the communication based on the measurement of available bandwidth.

16. The system of claim 15, wherein the communication is routed via a network including a plurality of network elements, and wherein the communications endpoint determines the measurement of available bandwidth by sending one or more probe packets to one or more of the plurality of network elements.

17. The system of claim 16, wherein the one or more probe packets are sent during a period of silence of the communication.

18. The system of claim 11, wherein the communications endpoint is further adapted to echo a probe packet received from the second communications endpoint.

19. The system of claim 11, wherein the communications endpoint has access to an optimization database, wherein the optimization database includes at least one frames per packet value for each of a plurality of available CODECs.

20. The system of claim 19, wherein the optimization database further includes a minimum bandwidth for each of the plurality of available CODECs and frames per packet value combinations.

21. The system of claim 19, wherein the optimization database further includes a maximum tolerable packet loss ratio for each of the plurality of available CODECs and frames per packet value combinations.

22. The system of claim 11, wherein negotiating with the second communications endpoint to select the substitute CODEC set occurs after the monitored packet loss measure has exceeded the maximum packet loss threshold for a predetermined amount of time.

23. The system of claim 11, wherein the communications endpoint negotiates with the second communications endpoint to return to the first CODEC set when conditions are suitable.

24. The system of claim 11, wherein at least one of the communications endpoint and the second communications endpoint comprises a computer.

25. The system of claim 11, wherein at least one of the communications endpoint and the second communications endpoint comprises a mobile communication device.

* * * * *